6999X
S. Minton,
Washing Machine,
Patented Apr. 14, 1832.
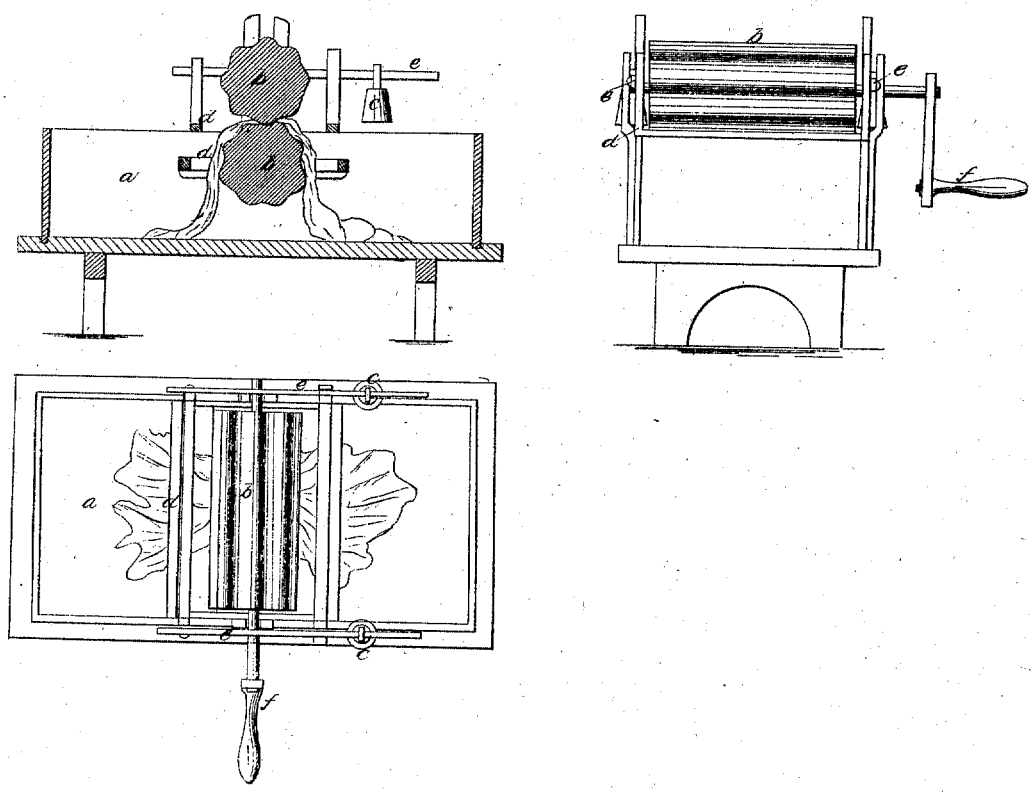

6999x April 14, 1832 183

Silvanus Minton. Anderson Dist. S.C.

Letters Patent

The Schedule referred to in these Letters Patent and making part of the same containing a description in the words of the said Silvanus Minton himself of his improvement in the washing machine To all to whom these presents shall come Greeting. Be it known that I Silvanus Minton of Anderson District and State of South Carolina have invented a new improved and useful Improvement in the mode of Washing clothes of all descriptions, of which the following is a full and exact description viz.

1st. A large Box 4 feet long two feet wide and one foot in depth, to be made water proof will be required.

2nd There are two Rollers each ten inches in diameter with 8 grooves on each one to fit in the other the cylinders of each roller to rest on seperate horizontal frames, one directly above and operating on the other.

3d. The length of the Rollers to correspond with the width of the Box. The lower Roller to run within 4 inches of the bottom of the Box. 4th To each end of the upper Roller weights to correspond with the kind of clothes to be washed must be attached to press it upon the lower Roller and to keep it steady Witnesses
Stephen Williams
J. C. Reese Silvanus Minton Exd. [illegible]
(276 words) Patented Apr. 14. 1832)
(Recorded [illegible] February 4th 1837)
[illegible]